United States Patent [19]
Brand et al.

[11] Patent Number: 5,384,208
[45] Date of Patent: Jan. 24, 1995

[54] CELL STRUCTURE FOR ELECTROLYZER UNITS AND FUEL CELLS

[75] Inventors: Rolf A. Brand, Ottobrunn; Hans Hofmann, Mühlheim; Jürgen Hildebrandt, München, all of Germany

[73] Assignee: Deutsche Aerospace AG, Germany

[21] Appl. No.: 31,327

[22] Filed: Mar. 15, 1993

[30] Foreign Application Priority Data

Mar. 13, 1992 [DE] Germany .................... 4208057

[51] Int. Cl.⁶ .................... H01M 2/18; C25B 9/00
[52] U.S. Cl. .................... 429/34; 429/38; 429/39; 204/253; 204/254
[58] Field of Search .................... 429/34, 30, 38, 39; 204/253, 254

[56] References Cited

U.S. PATENT DOCUMENTS

| | | | |
|---|---|---|---|
| 3,432,357 | 3/1969 | Dankese | 429/34 |
| 3,516,867 | 6/1970 | Dankese | 429/38 X |
| 4,788,110 | 11/1988 | Bernard | 429/39 X |
| 5,110,692 | 5/1992 | Farooque et al. | 429/38 X |
| 5,130,008 | 7/1992 | Cabaraux et al. | 204/253 X |

FOREIGN PATENT DOCUMENTS

| | | |
|---|---|---|
| 0172495 | 2/1986 | European Pat. Off. . |
| 0182114 | 5/1986 | European Pat. Off. . |
| 340820 | 4/1989 | European Pat. Off. ........ 429/34 |
| 0426265A2 | 9/1990 | Germany . |

*Primary Examiner*—John S. Maples
*Attorney, Agent, or Firm*—Evenson, McKeown, Edwards & Lenahan

[57] ABSTRACT

A cell structure for electrolyzer units and fuel cells, comprising an electrolyte-permeable diaphragm, one metallic, electrolyte-permeable electrode respectively on either side of the diaphragm, an electrically conductive bipolar cell partition respectively which bounds the cell, one electrically conductive structure respectively between the electrode and the cell partition which acts as an elastic spacer and current supply, and a frame construction which encloses the cell on the circumference side. The diaphragm is constructed as a flat plate, with layer-type electrodes resting directly on it and integrally connected with it. The cell partitions are constructed of sheet metal, if necessary, with spacers. The spaces between the electrodes and the cell partitions are at least partially filled with lamellar structures which are axially and perpendicularly fluid-permeable and rest against the electrodes. The lamellar structures consist of a plurality of wall elements which are arranged at a narrow distance and have interposed spacers.

22 Claims, 3 Drawing Sheets

FIG. 4
FIG. 5
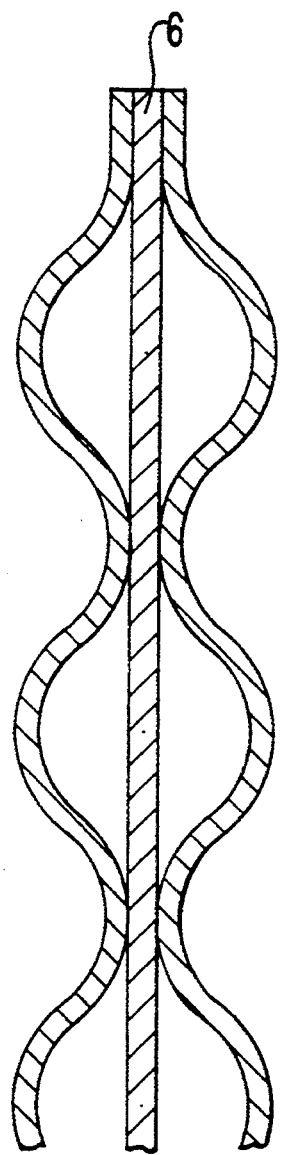
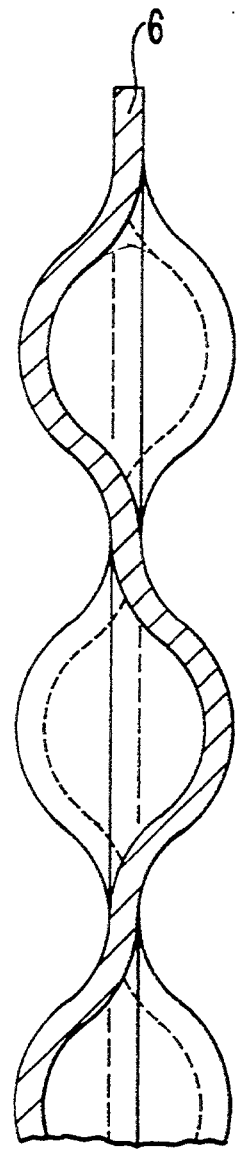

CELL STRUCTURE FOR ELECTROLYZER UNITS AND FUEL CELLS

BACKGROUND AND SUMMARY OF THE INVENTION

The present invention relates to a cell structure for a plurality of electrolyzer units and fuel cells which are electrically and geometrically connected in series, particularly for the evolution of hydrogen and oxygen or for operation with hydrogen and oxygen.

The characteristic elements of such cells are a central diaphragm, electrodes on both sides of the diaphragm, bipolar cell partitions and elastically flexible spacers between the electrodes and the cell partitions. (There is also, of course, a frame which is of less interest in the present context.) The conditions in the boundary layers of adjacent elements (that is, mechanical connections, electrical contacts, possible relative movements, fluidic transitions, starting points for corrosion, etc.) are of great significance for the electrochemical and mechanical characteristics of the cell and thus of the electrolyzer unit and of the fuel cell, because they affect in particular its efficiency and the service life. For the purpose of obtaining a structure which is mechanically or structurally as simple, sturdy and durable as possible, while the cell voltages for a given current density are as low as possible, a preference exists for the so-called zero gap arrangement, in which the electrodes rest directly against the diaphragm, without any gap and without any spacers.

As disclosed in German Patent Document DE-OS 32 24 556, the diaphragm may consist of a metal netting coated with oxide ceramics, which affords relatively good stability characteristics. Moreover, German Patent Document DE-PS 37 43 354 teaches that the electrodes may consist of porously coated, catalytically activatable perforated plates, metal nettings or expanded metal elements. Where such electrode units are combined with a metal-netting-supported diaphragm, the risk exists, among others, that, as a result of frictional events, local overloading or corrosive events, the metal netting in the diaphragm can become partially exposed, which may lead to a shorting of the electrodes.

The best solution for the foreseeable future for a zero gap configuration seems to be a combination of the electrodes with the diaphragm to form an integral unit (EDE-plate=Electrode-Diaphragm-Electrode plate), which permits the diaphragm to be constructed in an unsupported manner (that is, without any inner metal nettings, etc.). The integration of these three functional elements takes place during manufacturing. The diaphragm is made from a ceramic blank, onto which the electrodes are applied in powder or paste form, by means of sintering or reductive sintering in the manner known to those skilled in the art. German Patent Document DE-OS 32 24 555 and the related European Published Patent Applications 0 297 315 and 0 297 316, for example, address the manufacture of such EDE-units.

In such EDE-composites, the electrodes virtually take over the support of the interposed diaphragm. Moreover, in tests it has been found that such EDE-plates can provide high current densities at low cell voltages and moderate cell temperatures.

In the spaces required, among other things, for electrolyte storage, between the electrodes of the EDE-plate and the bipolar cell partitions (that is, in the anode and cathode spaces), electrically conductive spacers are arranged which contact and center the EDE-plate. Preferably, elastically flexible elements, such as corrugated sheets, sheet metal strips or metal wool are used. It is also possible to mold the spaces into the cell partitions; for example, as naps which project axially to both sides. Such a construction is disclosed, for example, in European Patent Document EP-OS 0 340 820, albeit not for a zero-gap arrangement, but rather for a microgap arrangement with a narrow distance between the electrodes and the diaphragm, which is produced by additional non-conductive spacers in the electrodes.

Another known electrode structure having a zero-gap arrangement, but without forming a unit with the diaphragm, is composed of a lamellar structure in the form of a plurality of straight sheet metal strips arranged vertically and perpendicular to the diaphragm, at a narrow distance from one another, with interposed spacers. The prestressed zigzagging spacers are also made of sheet metal strips, and are disposed between the straight sheet metal strips. The spacers are arranged such that their zigzagging front edges contact the diaphragm along the whole electrode height. The distance between the straight sheet metal strips is dimensioned such that, while the number of layers is as small as possible, a sufficient circulation of fluids, such as the electrolyte is still possible. Because of the spacer arrangement, the main delivery direction extends horizontally, and perpendicular to the diaphragm. However, because of the contacting conditions between the parts, a perpendicular flow of the electrolyte or of the generated or fed gas is also possible. In addition, the gas generated by electrolysis can rise substantially unimpaired in the anode or cathode space kept free by spacers between the electric and the cell partition.

A disadvantage of this type of electrode, however, lies in the necessary filigree, high-expenditure structure. Moreover, tests with such electrodes have indicated that they are inferior to other zero gap arrangements with porous electrodes, particularly of the EDE-unit, in that they require higher cell voltages to achieve a given current density. Another disadvantage is the relatively intensive substance transport due to the delivery effect (electrolyte circulation, gas transport) in the spaces between the lamellae.

It is therefore an object of the present invention to provide a cell structure for electrolyzer units and fuel cells having a zero-gap arrangement, which permits a still higher efficiency, more favorable operating conditions and a longer service life.

This object is achieved according to the invention, in which a zero-gap arrangement with a plate-shaped diaphragm and electrolyte-permeable electrodes on both sides, is combined with a lamellar structure which fills out the electrode space at least partially and rests against the electrode, the lamellar structure being designed in the manner of the described electrode. The lamellar structure according to the invention has several functions. It serves as a mechanical spacer; that is, as a spring-elastic support of the electrodes and the diaphragm, which provides an optimal introduction and distribution of force. It also forms an electrical connection between the electrode and the cell partition, with a favorable current distribution and contact; and it promotes electrolyte circulation and gas transport by means of its delivery effect.

Tests of electrolyzer units having such combination of the zero-gap arrangement and the lamellar structure have shown that, in comparison to known EDE-units with spacers, given current densities and gas generation rates are reached with still lower cell voltages and significantly lower cell temperatures. In other words, the invention reduces the electric or chemical energy requirement, and improves the operating conditions as a whole, which has a positive effect in many respects. In an embodiment without additional spacers, the bipolar cell partitions can be constructed in a particularly simple and low-cost manner as flat plates made of sheet metal.

Other objects, advantages and novel features of the present invention will become apparent from the following detailed description of the invention when considered in conjunction with the accompanying drawings.

BRIEF DESCRIPTION OF THE DRAWINGS

FIGS. 4 and 5 are cross-sectional views of a cell partition arrangement having spacers.

DETAILED DESCRIPTION OF THE DRAWINGS

Figure 1:
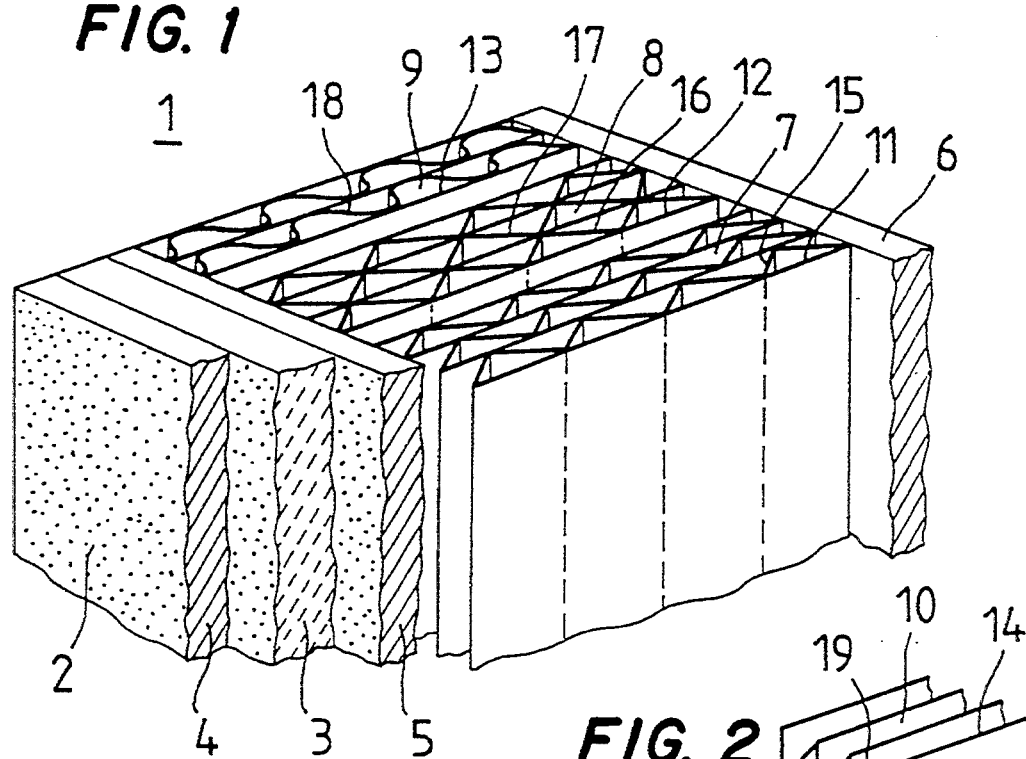
FIGS. 1 and 1a are perspective partially broken away views of a cell structure according to the invention with an essentially vertical flow direction.

In the perspective representation of the cell structure 1 shown in FIG. 1, the longitudinal (axial) cell direction extends from the left front to the right rear; and the transverse cell direction extends correspondingly from the left rear to the right front. For simplicity, only one electrode space (that is, either the anode space or the cathode space) and three iterations of the lamellar structure are shown. The electrolyte-permeable electrode 4 which belongs to the adjacent electrode space (not shown) is illustrated at the left front of FIG. 1. In a zero-gap arrangement, this electrode 4 is followed by the diaphragm 3 and the second electrode 5, all of which in the newest state of the art are combined to form an integral EDE-plate 2. The porous electrolyte-permeable structure of the EDE-plate 2 is indicated by the dotting of the surfaces of its three layers.

At the right rearward end of the cell structure 1, the cell partition 6 is shown, which may be adjacent to the next cell (not shown), the cell partition 6 being constructed as a simple flat impermeable sheet metal plate.

Special attention should be paid to the elements which, in the present example, completely fill the electrode space between the electrode 5 and the cell partition 6 and which form the lamellar structure. In order to show several possible constructions as examples, three different lamellar structures 7, 8 and 9 are illustrated from the right front to the left rear. These differ only in their shape and the alignment of their spacers and have, as a common characteristic, a perpendicular main flow direction. In actual embodiments, of course, as a rule, only a single lamellar structure type will be used for each electrode space or each cell.

The lamellar structure 7 which is shown in the very front comprises wall elements 11 which are arranged essentially vertically and axially with respect to the cell axis, in parallel spaced relationship, separated by a short distance from one another, as with zigzagging spacers 15 inserted under a prestress between the wall elements 11. The wall elements 11 consist of flat straight sheet metal strips; the spacers 15 are also made of sheet metal strips and are all arranged in an identical manner so that a pattern of zigzagging lines is created which are shifted in parallel. Such an arrangement has a relatively simple structure and relatively high elastic flexibility in the direction transverse to the longitudinal cell direction.

An amorphous sheet metal preferably nickel or a nickel-cobalt alloy with a thickness of approximately 30–40 $\mu$m is used for the wall elements 11 or for all elements. Amorphous metals are particularly corrosion proof and have a very smooth surface as well as a high modulus of elasticity even in the case of fairly large deformations. The sheet metal strips for the wall elements 11 have a length of approximately 1 m (cell height); a width of approximately 5 to 6 mm (axial cell depth); and have a distance from one another of approximately 0.2 to 0.8 mm.

Figure 3:
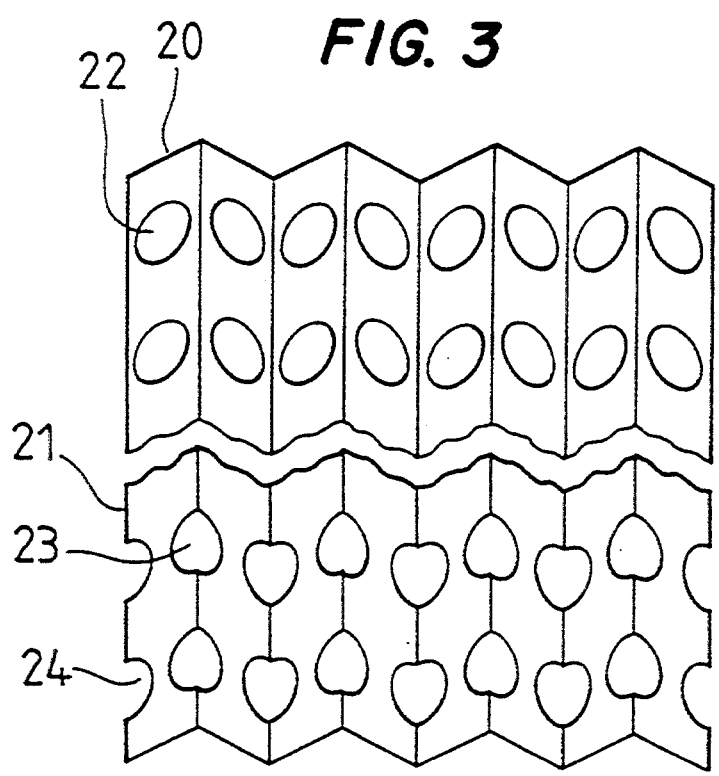
FIG. 3 is a perspective view of two spacers with differently arranged openings.
Figure 1A:
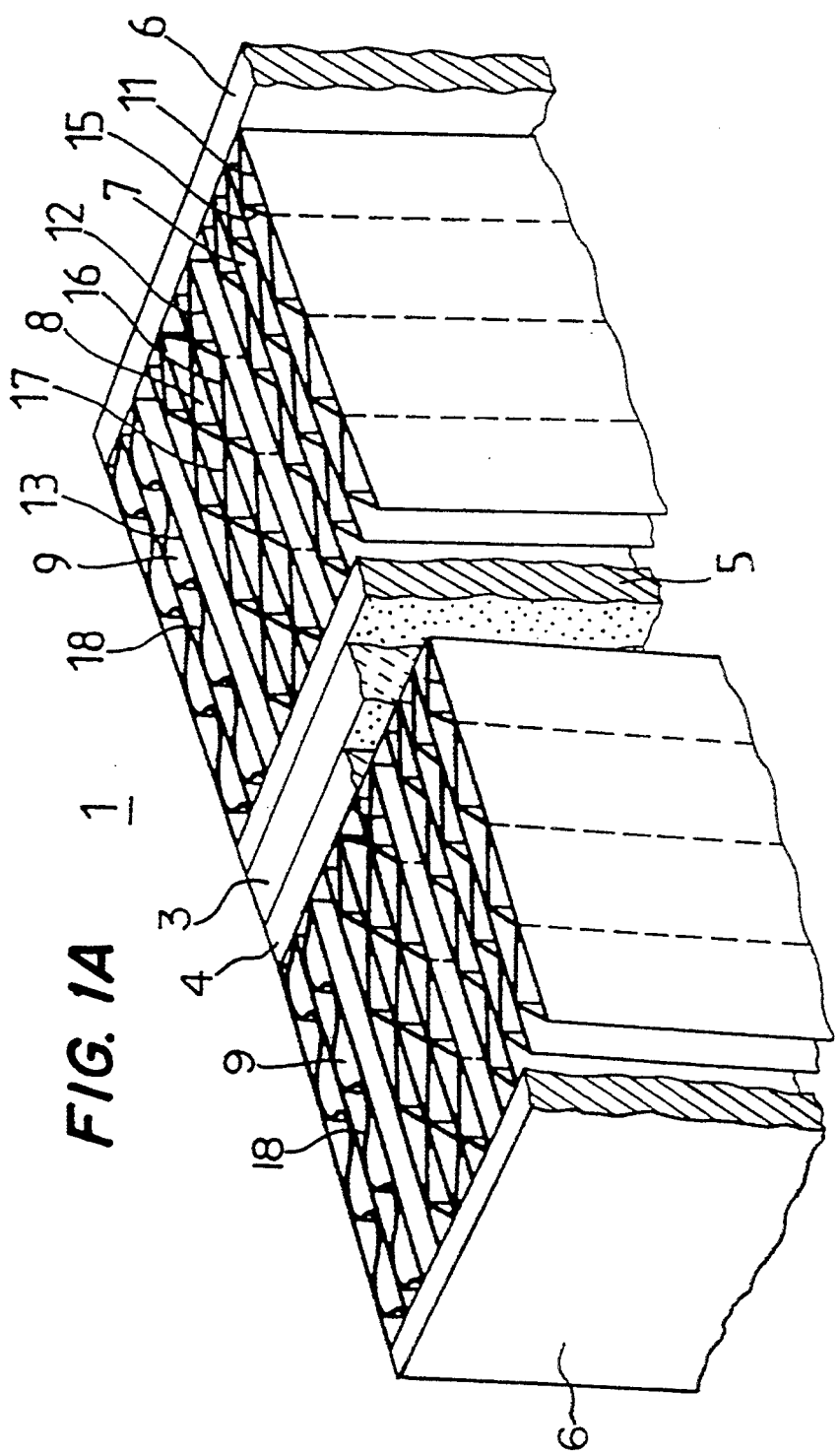

The lamellar structures 7, 8 and 9 are permeable to gas and fluid not only in the perpendicular direction, but in the axial direction as well. The fact is that, even if they consist of unperforated sheet metal strips, due for example to defects of form, the spacers do not completely seal against the wall elements along the whole length of their edges or of their peaks and valleys. Thus, in the case of all arrangements according to FIG. 1, a certain number of small axial breakthrough possibilities exist. If this is not sufficient, it is naturally possible to provide the spacers—as indicated in FIG. 3, with openings in a targeted manner.

The center lamellar structure 8 in FIG. 1 differs form the front lamellar structure in that the spacers 16 and 17 are arranged in mirror-inverted pairs between the wall elements 12 so that a net pattern is created in the top view. This arrangement promises a higher stiffness in the cell transverse direction.

In practice, in view of the fineness of these structures, the geometrical conditions will be much less precise than indicated in the figures, because of errors with respect to form and position of the elements. However, this does not result in any deviation from the principle of the invention.

The rearmost lamellar structure 9 in FIG. 1 has undulated (or wave shaped) spacers 18 between the wall elements 13. Such a wavy shape with soft roundings is more advantageous for the mechanical characteristics of the spacers. In particular, it reduces the risk of breakage because of a notch effect. It may be possible that particularly brittle amorphous metals can be deformed only in this or a similar manner.

Naturally, there are also other possible spacer shapes, for example, crenelates or trapezoids, which can be produced by a simple bending of sheet metal strips. It is also possible to construct the spacers from straight or regularly deformed metal netting strips with a spatial permeability.

Figure 2:
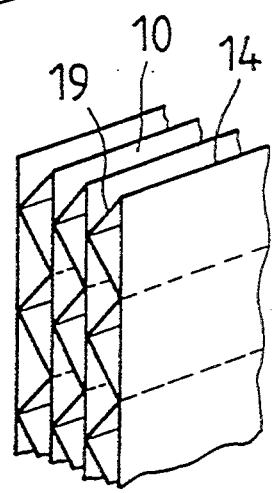
FIG. 2 is a perspective cutout of a lamella structure with an essentially horizontal orientation.

FIG. 2 shows a perspective cutout of a lamellar structure 10 with an essentially axial (that is, horizontal) flow direction. When installed, the face of this structure which points toward the left front would rest directly against the electrolyte-permeable electrode of the EDE-unit. The lamellar structure 10 is identical to the frontmost lamellar structure 7 according to FIG. 1, except that the zigzagging patterns of the spacers 19 extend perpendicularly to those of FIG. 1. Thus, the wall elements 14 together with the spacers 19 form a plurality of delivery ducts which extend horizontally (axially) and perpendicularly to the adjacent electrode.

With respect to the required perpendicular fluid permeability of the lamellar structure 10, the same principles discussed above with respect to FIG. 1 apply correspondingly to the lamellar structures illustrated in FIG. 2.

A certain advantage of the lamellar structure 10 in comparison to the structures according to FIG. 1 is the larger electric contact surface toward the electrode and toward the cell partition afforded by the front faces of the spacers 19. Naturally, as alternatives to the zigzagging shape, other spacer forms (wavy line, etc.) and other constructions (such as a metal netting) may also be used.

The decision on whether a perpendicular main flow direction (FIG. 1) or an axially/horizontal main flow direction (FIG. 2) is to be preferred can probably not be made before corresponding tests have been carried out, based on specific design requirements of the particular application. It is possible, that both arrangements are justified.

FIG. 3 is a perspective view of two zigzagging spacers 20 and 21 with holes 22 and 23 and edge recesses 24. As mentioned above, the holes and the edge recesses serve to increase the fluid transport transversely to the main flow direction—perpendicularly to the main flow direction in FIG. 3. In the case of the upper spacer 20, the circular holes 22, which appear elliptical in the perspective view, are situated in the plane surface sections. In the case of the lower spacer 21, the circular holes 23, which appear heart-shaped in the perspective view, are situated in the area of the folding points, which may facilitate a bending of the sheet metal strips. In addition, there are semicircular edge recesses 24 on the left and the right front edges.

The constructions according to FIG. 3 are also only examples. Naturally other forms and configurations of holes are also possible, and also in conjunction with wavy and differently shaped spacers. When metal netting strips are used, of course, such holes are not necessary.

A cell structure according to the invention with an EDE-plate made of an amorphous metal which is catalytically activated on both sides and has one anodic and cathodic lamellar structure respectively, achieves a cell voltage of below 1.5 V while the current density is 5 kA/m$^2$, or a cell voltage of approximately 1.6 V while the current density is 10 kA/m$^2$, with a cell temperature of approximately 80° C., and the cell may be operated in an unpressurized manner. Approximately comparable voltage and current density values may be achieved by means of an EDE-unit without any lamellar structure, only at cell temperatures of 120° to 150° with the cell pressurized.

Another advantage of the invention is the possibility of operating the cells as gas lift cells, in which they are filled with the electrolyte only up to a small portion of their height (for example, 10%), and the air lift pump effect of the generated gases in the lamella spaces distributes the electrolyte over the cell surface. This gas lift principle permits operation without any electrolyte circulating pump and is of particular interest for small to medium cell sizes.

In this case, the gas/electrolyte separation takes place in the upper portion of the cell in one free space respectively which is not filled by the lamellar structure. This also renders individual separators and circulating pipe systems superfluous. For the return flow of the electrolyte, which is delivered continuously in the lamellar structure in the upward direction and toward the cell partition, into the electrolyte sump, at least one specific free space is provided as the flow cross-section without any delivery effect. This free space may be situated axially between the lamellar structure and the cell partition and/or laterally between the lamellar structure and the cell frame, and is kept free by suitable spacers which interfere with the perpendicular flow as little as possible. In the case of the axial arrangement of the free space on the bipolar cell partition, the spacers may be fastened on the cell partition or may be integrally molded into it, for example, as nubs which project axially on both sides. In this case, in addition to the mechanical support, the spacers also take over the function of providing electrical contact. In the case of the gas lift principle, it must be assumed that the volumetric proportion of the lamellar structure in the electrode space amounts to at least 20%.

The present invention can also be applied in an unlimited manner to fuel cells. In this case, it must only be observed that the electrodes must have, hydrophobic surfaces on their sides facing away from the diaphragm in order to permit an effective gas penetration into the electrodes. This is best achieved by a layering on the basis of PTFE in a manner well known to those skilled in the art. In this case, the lamellar structures promote the transport and distribution of the fuel gas and of the gaseous oxidation agent.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A cell for electrolyzer and fuel cell units having a plurality of cells which are electrically and geometrically arranged in series, said cell comprising:

a gas separator comprising a diaphragm in the form of a flat plate which divides the cell into an anode space and a cathode space, said diaphragm being permeable to an electrolyte;

two metallic layer electrode elements sandwiched against said diaphragm, on opposite sides thereof, said two electrode elements being permeable to said electrolyte;

two gastight, electrically conductive bipolar cell partitions arranged parallel to one another and to said two electrode elements at opposite ends of said cell, said two bipolar cell partitions separating said cell from adjacent cells, said two bipolar cell partitions being made of sheet metal;

a first of said two cell partitions and of said two electrode elements defining said cathode space therebetween, and a second of said two cell partitions and of said two electrode elements defining said anode space therebetween;

each of said cathode space and said anode space being at least partially filled by respective electrically conductive, elastically deformable spacer arrangements which are mechanically and electrically connected between said electrode elements and said cell partitions whereby said spacer arrangements provide electric current conducting paths between said electrode elements and said cell partitions, and enclose said cell on lateral sides thereof;

said spacer arrangements comprising lamellar structural elements which are gas permeable and electrolyte permeable, at least in an axial direction perpendicular to said diaphragm and in a vertical direction parallel to a plane of said diaphragm; and said lamellar structured elements comprising a plurality of identical layers of approximately axially and vertically aligned wall elements which are maintained in parallel spaced relationship and in close proximity to each other, by a plurality of spacers therebetween.

2. Cell structure according to claim 1, wherein said layer electrode elements have microscopic openings therein.

3. Cell structure according to claim 1, wherein said electrodes are integrally connected to said diaphragm.

4. Cell structure according to claim 1, wherein said bipolar partitions have a smooth surface.

5. Cell structure according to claim 1, wherein said bipolar partitions have fitted on spacers.

6. Cell structure according to claim 1, wherein said bipolar partitions have molded in spacers integral thereto.

7. A cell structure according to claim 1, wherein the diaphragm and the electrodes arranged on opposite sides thereof are combined to form an integral unit.

8. A cell structure according to claim 1, wherein the electrodes arranged on opposite sides of the diaphragm are connected integrally, and in an electrically conductive manner, with the lamellar structured elements.

9. A cell structure according to claim 1, wherein at least surfaces of the electrodes facing away from the diaphragm are activated catalytically.

10. A cell structure according to claim 8, wherein at least surfaces of the electrodes facing away from the diaphragm are activated catalytically.

11. A cell structure according to claim 1, wherein the wall elements of the lamellar structured elements are constructed as straight flat sheet metal strips; wherein the spacers of the lamellar structures are constructed as regularly bent sheet metal strips; and wherein at least the wall elements are made of a material which is one of: an amorphous metal and an amorphous metal alloy.

12. A cell structure according to claim 11, wherein said regularly bent sheet metal strips are bent in zigzagging straight segments.

13. A cell structure according to claim 12, wherein said regularly bent sheet metal strips are bent in an undulating wave shape.

14. A cell structure according to claim 11, wherein said regularly bent sheet metal strips are bent in a sinusoidal shape.

15. A cell structure according to claim 11, wherein said sheet metal strips are provided with at least one of: openings therethrough and edge recesses.

16. A cell structure according to claim 11, wherein the elements of the lamellar structure in the cathode space consist of an amorphous nickel and in the anode space are made of an amorphous nickel-cobalt-alloy.

17. A cell structure according to claim 16, wherein the ratio of Ni to Co in said alloy is approximately 1 to 2.

18. A cell structure according to claim 1, wherein the wall elements of the lamellar structured elements are constructed as straight flat sheet metal strips, and wherein the spacers of the lamellar structured elements are one of: straight and regularly deformed.

19. A cell structure according to claim 18, wherein said spacers are formed of undulated metal netting strips.

20. A cell structure according to claim 1, wherein each cell is constructed as a gas lift cell without any electrolyte circulating pump which, before operation, is filled with an electrolyte only to a small portion of its height, and wherein at least one perpendicularly permeable larger flow cross-section is provided for the return flow of the electrolyte.

21. A cell structure according to claim 20, wherein said small portion is 10 percent.

22. A cell structure according to claim 1, wherein sides of the electrodes which face away from the diaphragm are hydrophobically coated by means of a material on a base of polytetrafluor ethylene.

* * * * *